(12) United States Patent
Alvis

(10) Patent No.: US 6,427,345 B1
(45) Date of Patent: Aug. 6, 2002

(54) METHOD AND APPARATUS FOR A LINE BASED, TWO-DIMENSIONAL CHARACTERIZATION OF A THREE-DIMENSIONAL SURFACE

(75) Inventor: Roger L. Alvis, San Carlos, CA (US)

(73) Assignee: Veeco Instruments, Inc., Plainview, NY (US)

( * ) Notice: Subject to any disclaimer, the term of this patent is extended or adjusted under 35 U.S.C. 154(b) by 0 days.

(21) Appl. No.: 09/189,443

(22) Filed: Nov. 10, 1998

(51) Int. Cl.[7] ................................................. G01B 5/26
(52) U.S. Cl. ......................................................... 33/121
(58) Field of Search ........................... 33/121, 123, 124, 33/122, 546, 551, 553, 554, 12; 702/97, 155, 156, 157, 158

(56) References Cited

U.S. PATENT DOCUMENTS

| | | | |
|---|---|---|---|
| 4,377,911 A | * | 3/1983 | Iida et al. ...................... 33/551 |
| 4,617,740 A | * | 10/1986 | Mikio .......................... 33/123 |
| 4,871,938 A | | 10/1989 | Elings et al. |
| 4,889,988 A | | 12/1989 | Elings et al. |
| 4,893,260 A | * | 1/1990 | Arakawa ..................... 702/156 |
| 4,954,704 A | | 9/1990 | Elings et al. |
| 5,025,658 A | | 6/1991 | Elings et al. |
| 5,051,646 A | | 9/1991 | Elings et al. |
| 5,077,473 A | | 12/1991 | Elings et al. |
| 5,081,390 A | | 1/1992 | Elings |
| 5,146,690 A | | 9/1992 | Breitmeier |
| 5,189,906 A | | 3/1993 | Elings et al. |
| 5,198,715 A | | 3/1993 | Elings et al. |
| 5,204,531 A | | 4/1993 | Elings et al. |
| 5,224,376 A | | 7/1993 | Elings et al. |
| 5,229,606 A | | 7/1993 | Elings et al. |
| RE34,331 E | | 8/1993 | Elings et al. |
| 5,237,859 A | | 8/1993 | Elings et al. |
| 5,266,801 A | | 11/1993 | Elings et al. |
| 5,306,919 A | | 4/1994 | Elings et al. |
| 5,307,292 A | * | 4/1994 | Brown et al. .................. 33/546 |
| 5,309,755 A | * | 5/1994 | Wheeler ....................... 33/551 |
| 5,329,808 A | | 7/1994 | Elings et al. |
| 5,400,647 A | | 3/1995 | Elings |
| 5,415,027 A | | 5/1995 | Elings et al. |
| 5,553,487 A | | 9/1996 | Elings |
| 5,557,156 A | | 9/1996 | Elings |
| 5,617,645 A | * | 4/1997 | Wick et al. .................... 33/551 |

OTHER PUBLICATIONS

Fourth Workshop on Industrial Applications of Scanned Probe Microscopy, The American Vacuum Society (Nanometer-scale Science & Technology Division), May 6–8, 1997 Gaithersburg, MD.

* cited by examiner

Primary Examiner—Christopher W. Fulton
(74) Attorney, Agent, or Firm—Patterson, Thuente, Skaar & Christensen, P.A.

(57) ABSTRACT

Surface characteristics of a surface of a three-dimensional object, such as surface area, surface area enhancement (i.e., the ratio of the actual surface area to an area of that surface projected onto an X-Y plane), and surface roughness parameters can be calculated based solely on line-based measurements and without performing the calculations required to actually create a three-dimensional image of that surface. Because a true three-dimensional image is not created, interline registration and low frequency noise limitations are eliminated from the measurement, and data can be acquired by scanning bidirectionally without adversely affecting the results. Likewise, the analysis time required to determine surface parameters is a fraction of that required by image-based techniques. This technique, being line-based rather than image-based, can be performed by any probe-based instrument, optical-based instrument, or any other instrument capable of measuring a sample surface in either digital or analog fashion.

32 Claims, 4 Drawing Sheets

METHOD AND APPARATUS FOR A LINE BASED, TWO-DIMENSIONAL CHARACTERIZATION OF A THREE-DIMENSIONAL SURFACE

BACKGROUND OF THE INVENTION

1. Field of Invention

The present invention generally relates to the metrology of three-dimensional surfaces and, more particularly, relates to a method and apparatus for describing surface characteristics such as surface area, surface area enhancement, and surface roughness parameters, based solely on line-based measurements and without requiring the calculations to be derived from, or based on, a three-dimensional image of the surface, or on data necessary to generate such an image.

2. Description of Related Art

A real surface may be generally defined as the infinitesimally thin outer skin of a three-dimensional object. Thus, while the three-dimensional object itself has an associated appreciable volume, the surface of the three-dimensional object does not. Likewise, a single, generically shaped line-trace over the three-dimensional surface does not have any characteristics of area, but rather has the one-dimensional characteristic of length.

With regard to spatial directions on a surface, the Cartesian-coordinate system is one acceptable way to reference relative positions of general locations on that surface. In general, the orientation of the entire coordinate system is arbitrarily positioned with regard to a surface and its features, or components. In the case of a surface-metrology instrument, the Cartesian coordinate system axes are usually fixed by the design of the instrument and are specified according to this frame of reference. Generally, the determination of surface characteristics such as the actual surface area of a non-planar surface requires a full consideration of all three spatial dimensions, namely width (X-direction), depth (Y-direction), and height (Z-direction).

A surface metrology technique based on all three dimensions requires use of a metrology tool that is capable of accurately tracking the surface topography and recording relative Z heights with respect to both the X position and the Y position of a particular Z height measurement. The manner in which the data are thus acquired and manipulated to determine surface characteristics distinguishes related art from the present invention.

The related art generates a topographical map of the surface of the sample from which the sample's surface area may be determined. The map may either be recorded in analog or digital fashion. In the case of a digital measurement, the representative map typically consists of a two-dimensional array of data points or "pixels" with an associated measured Z height for each X, Y position on the map.

One important characterization task for which the invention is useful is the determination of an actual total measured surface area ("$A_{ACT}$") from data obtained while scanning a surface. One accepted method for determining $A_{ACT}$ from a digitized topographical map of a non-planar surface is to describe the surface area as an array of n-subareas or shapes and to sum all of the areas of the n-shapes. The area of each of the n-shapes is the geometric area of each shape ("$a_n$"), formed between adjacent Z height values, where $A_{ACT} = \Sigma a_n$. The area of each shape is calculated from the relative height values of the adjoining pixels and basic geometric principles. The resulting surface area of each shape is counted once toward $A_{ACT}$.

It is common practice to also describe a measured surface in terms of a "normalized" surface area. The normalized surface area, or "surface area enhancement" ("SAE"), is the ratio of the measured surface area, as for example $A_{ACT}$ described above, to the projected surface area ("$A_{PROJ}$"). $A_{PROJ}$ is an area corresponding to the projection of the three-dimensional surface $A_{ACT}$ onto an X-Y plane. $A_{PROJ}$ is defined completely by the extrema of the X and Y coordinates of the topographical map. This ratio is bounded at the lower limit by unity, for a perfectly flat and level surface, and theoretically has no upper limit. The practical limitation on the ability to completely track the real surface, and to thereby accurately determine the SAE, is determined by the method employed to acquire the topographical map and is not to be considered a limiting factor in the scope of the present invention.

The related art for the determination of SAE is primarily limited in accuracy by the relative correspondence of the recorded Z height values to the actual topography of the surface. A secondary limiting factor in the accuracy of SAE determination and other surface characteristic determinations is the spatial frequency at which, or detail with which, the actual surface is sampled. In the example of a digitized topographical surface map, the sampling frequency corresponds to the spatial frequency of the pixels. Such a "grid" of pixels is usually arranged with equal spacing in both the X and Y directions and is typically constructed in a line-by-line fashion. Each such line is m pixels in length, and there are n lines. The result is the tracing of a grid of n lines by m pixels which extend in the X direction, and which are spaced from one another in the Y direction.

The primary consideration in determining the appropriate grid dimensions is that each surface feature is sampled in two dimensions sufficiently for the related art methodology to provide an accurate estimation of the surface area. Instruments capable of performing these functions are limited to scanning probe microscopes (SPMs), including atomic force microscopes (AFMs) and other instruments capable of acquiring and/or manipulating data usable to generate a three-dimensional image of the topography of a surface. Profilometers, which merely ascertain the profile of a two-dimensional line extending across this surface of the sample, generally cannot generate such an image without some additional means to raster the stylus, or surface to be characterized, in both X and Y dimensions while recording Z height values associated with a particular location on that surface.

Those skilled in the art of metrology and instrumentation recognize that the accuracy of a surface area measurement, a SAE measurement, or another surface characteristic measurement according to the related art could be greatly improved by increasing the spatial sampling rate in both the X and Y directions. However, one skilled in the art will also recognize that such an increase in the spatial sampling rate usually requires increased measurement time.

Furthermore, a skilled practitioner of surface metrology techniques is aware of the sensitivity of the related art methodology to measurement noise, particularly where such noise results from an artifactual mis-registration or misalignment between pixels in adjacent lines of pixels. This type of noise is typically referred to as "low frequency noise" because it is superimposed on the topographical map at rates much lower than the usual rate of measurement. It is also sometimes referred to as "inter-line noise" because it reflects differences in measurement along two adjacent traces in the X direction. Such inter-line or low frequency noise is particularly pronounced in related art SAE measurements because the noise in those measurements is shifted into the frequency domain at which the actual height data is recorded. Any relative displacement in X, Y, or Z data between entire lines will necessarily result in a less accurate measurement of actual surface area and SAE. Any such displacement resulting from various sources of low frequency noise contaminates the data from image-based surface metrology related art methods.

In order to minimize both measurement time and sensitivity to low frequency noise, a novel, line-based measurement method to determine SAE and other surface characteristics is proposed.

SUMMARY OF THE INVENTION

The present invention has been developed to overcome the above-described limitations in existing methodology for the determination of one or more surface characteristics of a three-dimensional surface.

It is accordingly an object of the present invention to provide an improved method for determining one or more surface characteristics of a three-dimensional surface.

Another object of the present invention is to provide an improved method for measuring the surface area of a three-dimensional surface.

Still another object is to provide an improved method of determining SAE.

In accomplishing these and other objects, the present invention provides for measuring the one-dimensional "surface" length of an arbitrarily shaped line traced over a surface of a three-dimensional object in order to determine at least one surface characteristic of interest. A method of making such a measurement according to the present invention comprises the steps of 1) physically measuring and reporting the total surface length of at least one line traced over at least a given region of the surface of the three-dimensional object, and 2) determining the surface characteristic of interest using the traced line(s).

In the case of an SAE measurement, the invention additionally includes determining and reporting the total projected length of the traced line(s), and finding the surface area enhancement of a given region associated with the line(s) as the squared ratio of the sum of individual surface lengths to the sum of individual projected lengths of the line(s).

As a result of the line-scan derivation of the surface area enhancement, the measurement method of the present invention is intrinsically insensitive to the low frequency noise problems of related art image-based surface area measurements. Another advantage of the present invention is an improvement in measurement speed over image-based measurements. A third benefit that applies to certain methods of tracing lines is the possible improved lifetime of the instrument. More specifically, probe-based and other physically-based surface metrology instruments often wear or break due to wear and tear occurring during data acquisition. The potential for a statistically justified reduction in the number of line traces required to make a reasonable estimate of the surface area can result in a proportionate increase in the lifetime of the measuring apparatus.

BRIEF DESCRIPTION OF THE DRAWINGS

The above and other objects and features of the present invention will become more apparent from the following description taken in conjunction with a preferred embodiment thereof with reference to the accompanying drawings, in which like parts are designated by like reference numerals throughout, and in which.

DETAILED DESCRIPTION OF THE PREFERRED EMBODIMENTS

At the core of the present invention is the realization that surface characteristics of a surface of a three-dimensional object, such as surface area, surface area enhancement (i.e., the ratio of the actual surface area to an area of that surface projected onto an X-Y plane), and surface roughness parameters can be calculated based solely on line-based measurements, without requiring data to be in a form suitable for the creation of a three-dimensional image of that surface. Because a true three-dimensional image is not created, inter-line or low frequency noise is eliminated from the measurement, and data can be acquired by scanning bidirectionally without adversely affecting the results. This technique, while being line-based rather than image-based, is also applicable, post-facto, using data pre-recorded by any probe-based instrument, optical-based instrument, or any other instrument capable of recording data representative of a sample surface. The invention can be used in any application in which there is a need to determine a three-dimensional surface characteristic of a surface. Hence, while the invention will now be described in conjunction with determining surface characteristics of a conductive plate of a capacitor, it should be understood that this is merely an illustrative example and that the invention is not so limited.

Figure 1:
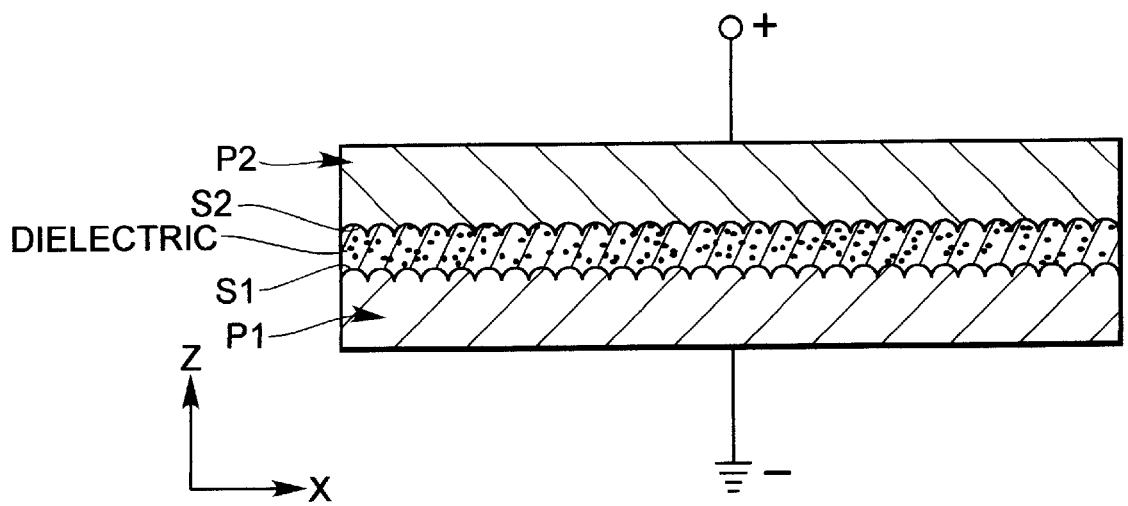
FIG. 1 is a sectional side elevation view of a capacitor having surface characteristics that can be measured in accordance with the present invention.

Referring to FIG. 1, a capacitor C is illustrated to which the methodology of the invention is applicable. The capacitor C may, for instance, be designed for use with a dynamic random access memory (DRAM) which, as is known in the art, uses charge storage on the capacitor to represent binary data values. The illustrated capacitor C has first and second conductive plates P1 and P2 disposed on opposite sides of a dielectric formed from $SiO_2$ or another dielectric material. The surfaces S1 and S2 of the plates P1 and P2 that face one another do not lie solely in the X-Y plane, but instead incorporate a complex structure such as a hemispherical grain (HSG) structure having surface variations in the vertical or Z direction. Complex structures of this type are increasingly used in capacitors because capacitance increases proportionally to surface area and because there is an ever-increasing demand to maximize memory storage capacity in a minimal space. It is also highly desirable to precisely measure the capacitance of a capacitor. Assuming a known dielectric constant and other known electrical properties of the capacitor, a precise capacitance measurement requires an accurate measurement of the area of the surface S2 of the plate P2, or at least the surface area enhancement, to determine the enhanced capacitance over a flat-plate capacitor of projected area dimensions. It may also be desirable to determine roughness characteristics of the surface S2 such as skewness and kurtosis.

Figure 2:
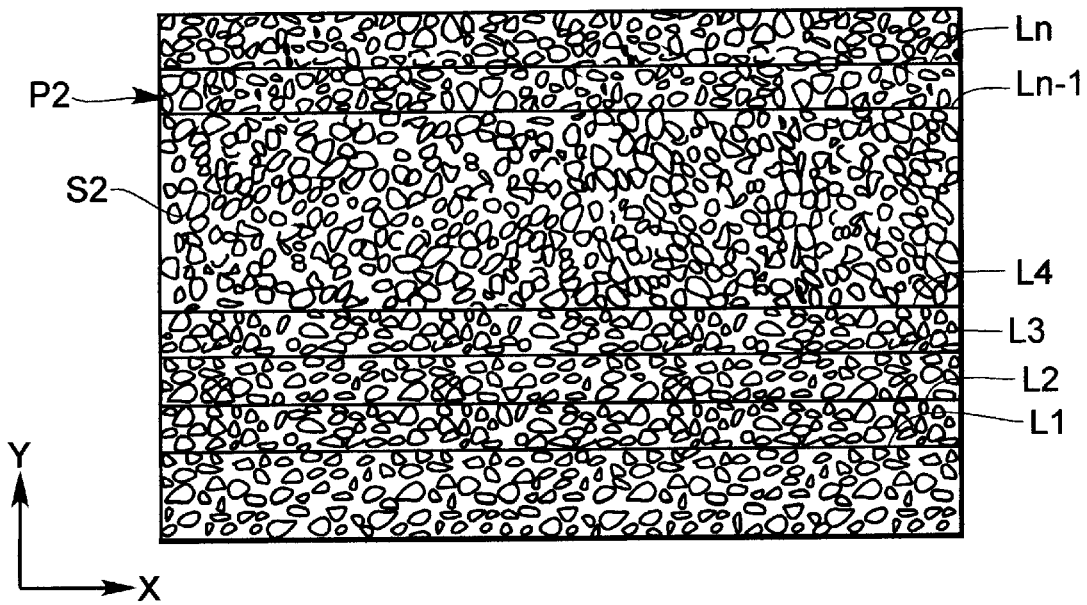
FIG. 2 is a plan view of the plate P2 of the capacitor of FIG. 1, schematically illustrating lines traced thereon pursuant to one embodiment of the inventive line-based surface characterization technique.

Turning now to FIG. 2, all or a portion of the surface S2 of the plate P2 can be characterized, without generating a three-dimensional image of that surface or even acquiring and manipulating the data required to generate such an image, by obtaining data along one or more of lines L1, L2, L3 . . . Ln extending along the surface S2. The lines will generally be described herein as being "traced" because the currently preferred technique for obtaining the data required to generate these lines is to scan a probe of an AFM (in any of the several available modes, e.g. contact mode and TappingMode (TappingMode is a Trademark of Digital Instruments, a Division of Veeco Instruments, Inc.)) across the surface S2 as detailed below. However, it should be understood that the data can be acquired in any of many conventional manners permitting line-based surface characterization. For instance, in addition to being acquired mechanically via operation of an AFM or a profilometer, the data could be acquired optically using an interferometer or the like, or even electronically or stereoscopically using an electron microscope or the like. Hence, references herein to the "tracing" of lines should not be construed to limiting the invention to data acquisition during relative linear movement between a probe and a surface.

The traced lines L1 to Ln of this embodiment extend in the X direction in FIG. 2 and are spaced from one another in the Y direction. The Y direction spacing preferably is sufficiently spaced to sample each microstructural component only once. It should be understood, however, that the traced lines could just as easily extend in the Y direction, for example, and be spaced from one another in the X direction. Hence, reference herein to extension in the "X direction" should not be construed as limiting the invention to any particular line tracing direction. Similarly, while all traced lines are illustrated as being the same projected length in the X direction to reflect common raster scanning techniques employed by AFMs and other instruments, the projected scan length may just as well vary from traced line to traced line. Moreover, while the traced lines are illustrated as being acquired over the entire surface S2 for ease of understanding, data seldom would be acquired from an entire sample surface in practice, but instead would be acquired from only a relatively small portion of that surface, typically covering no more than a few square micrometers. Calculations using this data can then be used to provide surface characteristic information concerning a larger area or even the entire area of the surface S2.

Each traced line L1 to Ln is formed from a plurality of m (typically 512) discrete data points or pixels so as to be connectable by line segments. An advantage of the present invention is that the spacing between adjacent traced lines in the Y direction can be much greater than the spacing between data points in the X direction, whereas traditional raster scan and other traditional imaging techniques produce a grid having the same number of data points in the X direction and in the Y direction. All that is required for the success of the present invention is to obtain data along a statistically significant number of traced lines. The number m of data points on each traced line typically is limited only by the instrumental constraints. In the case of highly symmetrical surfaces, it is conceivable that acceptable data can be obtained by the tracing of a single line, in which case n=1.

Once the data points along a particular traced line such as traced line L1 have been acquired and recorded, each of the data points along that traced line is assigned a particular X and Z value such that the point P1 is assigned a coordinate value $P1_x$, $P1_z$, the point P2 is assigned a value $P2_x$, $P2_z$, etc. These points are located along a common actual traced line L1 represented in FIG. 3. Much information can be obtained from the resultant coordinate-based line information by manipulating coordinate data information from adjacent data points on the traced line as well as from all data points along that traced line. For instance, information about variations in Z relative to variations in X can be easily obtained, readily permitting the determination of several roughness parameters including RMS, skewness, and kurtosis. The manner in which these parameters can be calculated along a particular traced line is well known to those skilled in the art and, accordingly, will not be detailed here.

Figure 3:
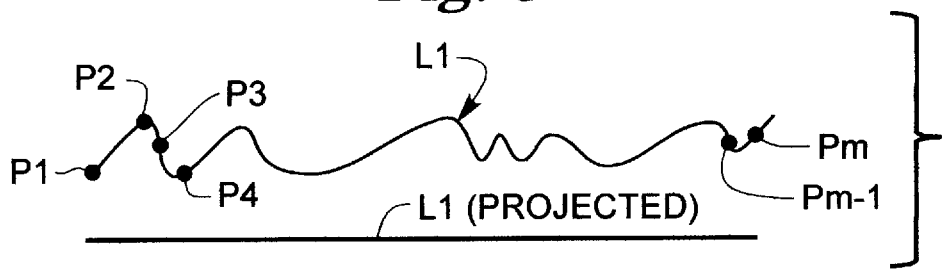
FIG. 3 illustrates one of the lines L1 illustrated on the plate P2 of FIG. 2 and the projection of that line.

Still referring to FIG. 3, traced line L1 has an actual surface length of $L1_{ACT}$. The X component length equals the projected length $L_{PROJ}$ of the traced line L1 because the projected length discounts its Z components--just as the projected area of a three-dimensional surface discounts area components due to surface variations in the Z direction. Hence, $L1_{ACT} \geq L1_{PROJ}$ under all conditions.

The inventive line characterization technique can be thought of as straightening the traced lines L1, L2, etc. to convert the Z components into "additional" X components to produce "straightened" traced lines. The inventive methodology, so described, is simplified accordingly by the isotropic characteristics of the sample plate P2 to determine a surface area, surface area enhancement, and other three-dimensional surface characteristics of at least a portion of the surface S2 of the sample plate P2 using the straightened traced lines.

Such methodology is easily adapted to the more general case of anisotropic surfaces by recognizing the fact that surface trace(s) used to determine "average" surface parameters must include a representative sampling of all directions within a surface. The straight-line trace methodology described previously for isotropic surfaces is still valid for the case of anisotropic surfaces. However, the surface parameters thus determined will be accurate only when describing those parameters in terms of a specific surface direction, namely that direction coincident with the orientation of the linear-trace. In the technologically important cases of "textured," anisotropic surfaces, where surface properties may vary in as few as two distinct directions, there may be advantages to describing the surface parameters in terms of specific directions.

Figure 2A:
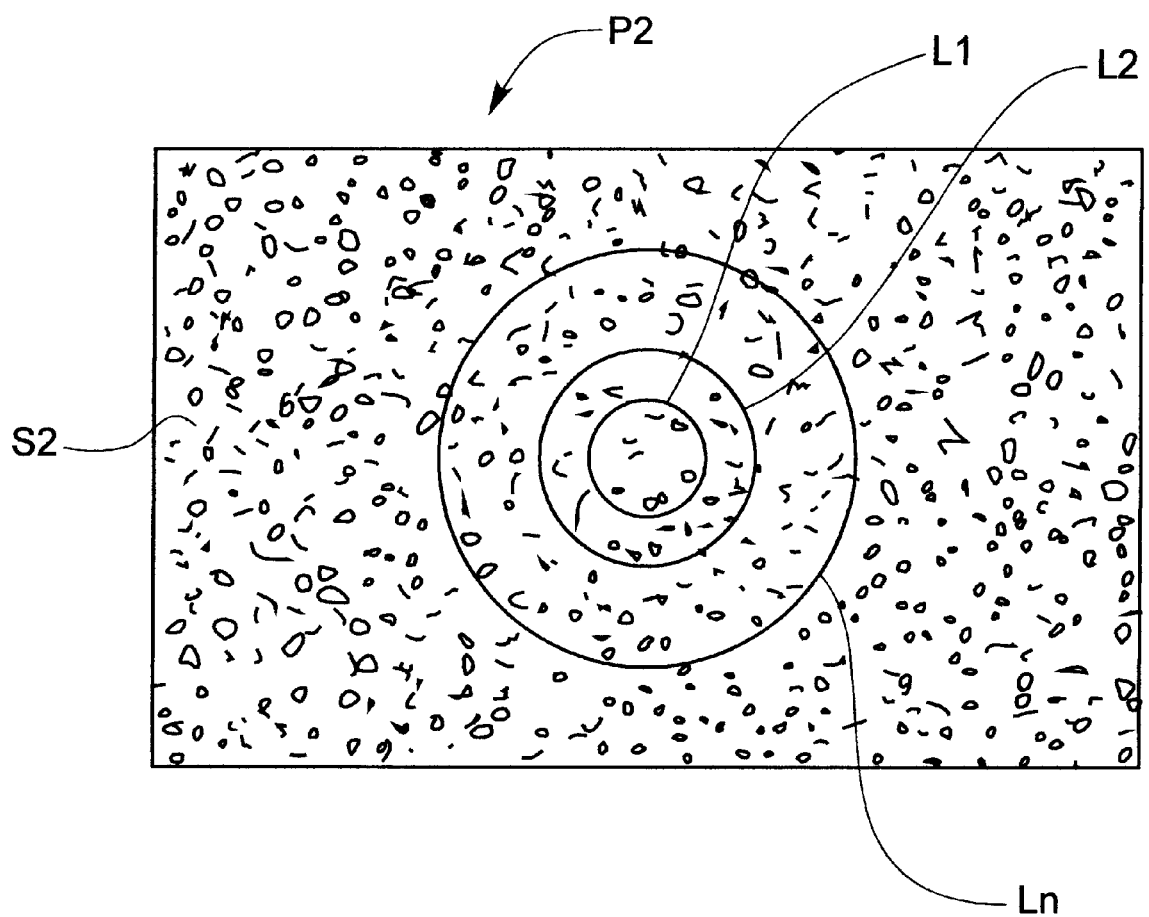
FIG. 2a is a plan view of the plate P2 of the capacitor of FIG. 1, schematically illustrating lines traced thereon pursuant to another embodiment of the inventive linebased surface characterization technique.

For cases of anisotropic surfaces, where a determination of average surface parameters is required, such parameters may be determined by tracing over the surface with at least one arbitrarily-shaped traced line of suitable length and orientation such that all directions on the surface are appropriately accounted for to obtain a directionally-averaged surface measurement. The most straightforward scheme, which applies equally well to the case of an isotropic surface, would be to make at least one trace over the surface in the shape of a circle as represented by the circular traced lines L1, L2 and Ln in FIG. 2a (while the circular lines are illustrated as being concentric for ease of illustration, the invention is not limited to concentric circular lines, to multiple circular lines, or even to a circular line). The surface area characteristics could then be determined according to the above-described methodology, with the number n of traced lines, being equal to the total number of circles traced and the total projected length of the traced line(s) being equal to the sum of the circumference(s) of the circle(s).

Line straightening entails a rather straight-forward mathematical computation according to the well-known Pythagorean theorem for right triangles. Still referring to FIG. 3, the actual length $d_i$ of a line segment connecting any two points along the traced line L1 can be calculated according to Equation (1):

$$d_i = \sqrt{(x_{i+1}-x_i)^2 + (z_{i+1}-z_i)^2} \tag{1}$$

where:
$X_i$ is the x-coordinate of $i^{th}$ data point disposed along any of the n traced lines;
$X_{i+1}$ is the x-coordinate of the $i+1^{th}$ data point;
$Z_i$ is the z-coordinate (height) value corresponding to the $i^{th}$ data point; and
$Z_{i+1}$ is the height value corresponding to the $i+1^{th}$ data point in the same traced line.

For the more general case of a non-linear traced line, or of a linear traced line that is arbitrarily oriented with respect to the reference coordinate system, equation (1) is modified accordingly:

$$d_i = \sqrt{(x_{i+1}-x_i)^2 + (y_{i+1}-y_i)^2 + (z_{i+1}-z_i)^2} \tag{1a}$$

where:
$X_i$ is the x-coordinate of the $i^{th}$ data point disposed along any of the n traced lines;
$X_{i+1}$ is the X-coordinate of the $i+1^{th}$ data point on that traced line;
$Y_i$ is the Y-coordinate of the $i^{th}$ data point;
$Y_{i+1}$ is the Y-coordinate of the $i+1^{th}$ data point;
$Z_i$ is the height corresponding to the $i^{th}$ data point; and
$Z_{i+1}$ is the height value corresponding to the $i+1^{th}$ data point.

The total actual length $L_{ACT}$ of a given traced line such as L1 equals the summation of the lengths of the line segments as represented by Equation (2):

$$L_{ACT} = \sum_{i=1}^{m-1} d_i \tag{2}$$

Where the appropriate di values are obtained from from equation 1 or 1a.

The determination of the projected length of a traced line oriented along a reference coordinate direction may be mathematically determined by the distance between the extreme points on the X-axis, or Y-axis describing the traced line in accordance with equation 3 and 3a, respectively:

$$L_{proj} = x_m - x_1 \tag{3},$$

or, $$L_{proj} = y_m - y_1 \tag{3a}$$

where: $X_m$ is the corresponding x-coordinate of the $m^{th}$ data point in a linear traced line oriented along the direction of the X-axis, and $X_1$ is the X-coordinate of the $1^{st}$ data point in the same traced line; or $Y_m$ is the corresponding y-coordinate of the $m^{th}$ data point in a linear traced line oriented in the direction of the y-axis, and $y_1$ is the distance value of the $1^{st}$ data point in the same traced line.

For the more general case of a traced line oriented randomly in the X-Y plane determined by the reference coordinate system, the traced line's projected length may be mathematically determined by the distance between the extreme points on the x-axis, or y-axis describing the line in accordance with equation 3b:

$$L_{proj} = \sqrt{(x_m-x_1)^2 + (y_m-y_1)^2} \tag{3b}$$

where:
$X_m$ is the corresponding x-coordinate of the $m^{th}$ data point on a randomly oriented linear trace;
$X_1$ is the X-coordinate of the $1^{st}$ data point in the same traced line;
$Y_m$ is the corresponding Y-coordinate of the $m^{th}$ data point; and
$Y_1$ is the Y-coordinate value of the $1^{st}$ data point.

Other appropriate equations for the projected length of non-linear, arbitrarily shaped traced lines, e.g., $2\pi r$ for a circle trace, etc., may be substituted for eqns. 3–3b.

Figure 4:
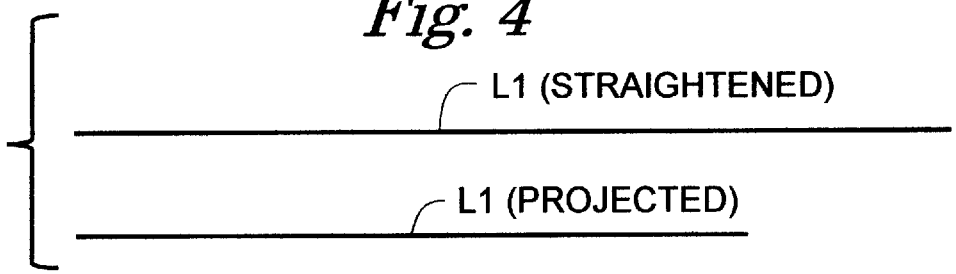
FIG. 4 corresponds to FIG. 3 and illustrates the projected length of the line L1 of FIG. 3 as well as the actual length of that line after it has been "straightened" to convert the vertical or Z components of that line into additional X length components.
Figure 5:
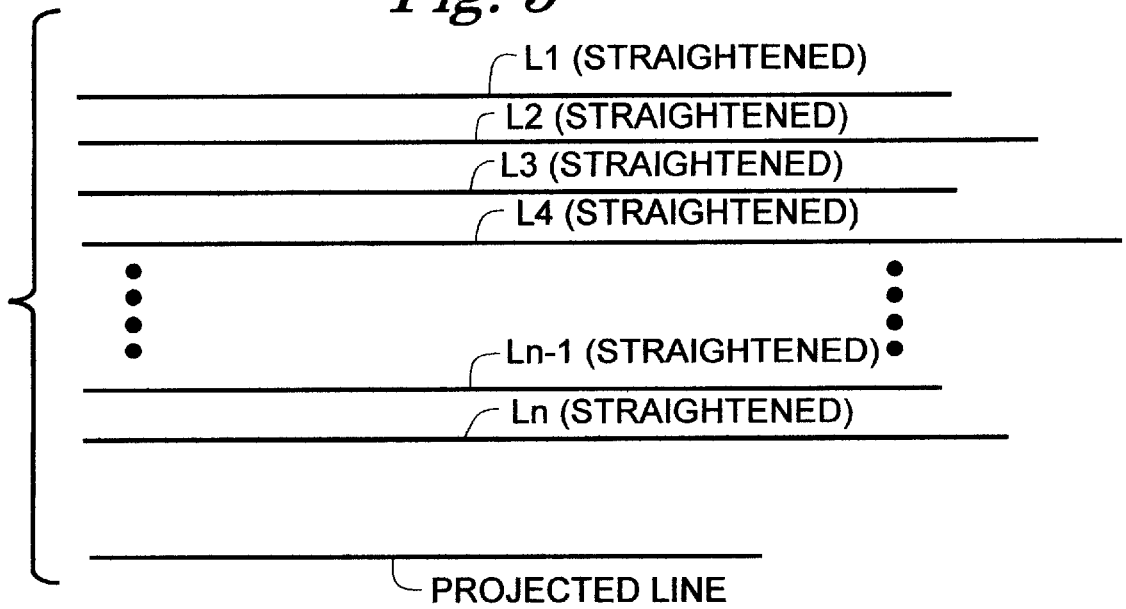
FIG. 5 corresponds to FIG. 4 and illustrates a comparison of all of the straightened lines L1 through Ln to the corresponding projected line.

A straightened linear-traced line is represented pictorially by the line $L1_{STRAIGHTENED}$ in FIG. 4. This straightened traced line may be substantially longer than the projected line $L1_{PROJECTED}$ due to the addition of the Z components of the traced line L1 to the X components. This straightening procedure or determination of actual length is repeated for each of the n traced lines, yielding a result illustrated pictorially FIG. 5.

The exemplary HSG and many other surface structures may be isotropic. As such, measurements of such isotropic structures taken along a linear trace extending in the X direction are interchangeable with measurements taken along a linear trace extending over that same surface structure in the Y direction. Accordingly, for isotropic surfaces, the surface area of a structure containing one of the n traced lines can be determined simply by squaring the length of that traced line. For the general surface with an undetermined degree of isotropicity, the surface area is necessarily an average property of the surface. In this case, an actual surface area can be determined by the square of the sum of the actual lengths of the appropriately shaped traced lines (If only a single line is traced, a surface area is simply the square of the actual length of the traced line. In the case of a circular traced line, the area is the square of the circumference of the circle). Hence, once all of the n traced lines have been straightened, an actual surface area of the surface S2 can be determined simply by squaring the sum of the n-actual traced line lengths in accordance with Equation (4):

$$A_{ACT} = \left( \sum_{j=1}^{n} L_{ACT_{(j)}} \right)^2 \tag{4}$$

In the likely case in which only a small portion of the surface S2 is scanned, the calculated actual surface area $A_{Act}$ is the area of scanned portion of the surface. Surface areas of larger portions of the surface S2 or even of the entire surface S2 can be extrapolated from this measurement.

Likewise, the projected area, $A_{proj}$ associated with the area $A_{ACT}$, can be determined by squaring the sum of the n-individual projected line lengths in accordance with Equation 4a:

$$A_{proj} = \left(\sum_{j=1}^{n} L_{proj(j)}\right)^2 \quad (4a)$$

These components of the methodology to determine the actual and projected surface areas, as well as the surface area enhancement, are generally applicable to any surface given, so long as the set of equations employed in the determination of $L_{proj}$ and $L_{act}$ is appropriate to the degree of isotropicity of the surface to which the descriptions are applied.

Referring again to FIG. 5, now that an actual surface area $A_{ACT}$ of the surface S2 is known, the surface area enhancement (SAE) can be determined by dividing the actual surface area by the projected surface area in accordance with Equation (5):

$$SAE = \frac{A_{ACT}}{A_{PROJ}} = \frac{\left(\sum_{j=1}^{n} L_{ACT(j)}\right)^2}{\left(\sum_{j=1}^{n} L_{proj(j)}\right)^2} \quad (5)$$

In the preferred embodiment in which a scanned-probe instrument such as an AFM is employed, the scan length, $L_{scan}$, of each of the n-linear traces usually is a user-defined, or "free" parameter and need not be separately measured. Thus, the prescribed scan length of each of the n-traced lines is a fixed length, and completely describes the projected line length of each of the n traced lines. Equations 3, 4, and 5 can be revised to yield the following Equations for projected length, projected area, and surface area enhancement, respectively:

$$L_{proj} = L_{scan} \quad (6)$$

$$A_{proj} = (n \cdot L_{scan})^2 \quad (6a)$$

$$SAE = \frac{A_{ACT}}{A_{PROJ}} = \frac{\left(\sum_{j=1}^{n} L_{ACT(j)}\right)^2}{(n \cdot L_{scan})^2} \quad (6b)$$

Figure 6:
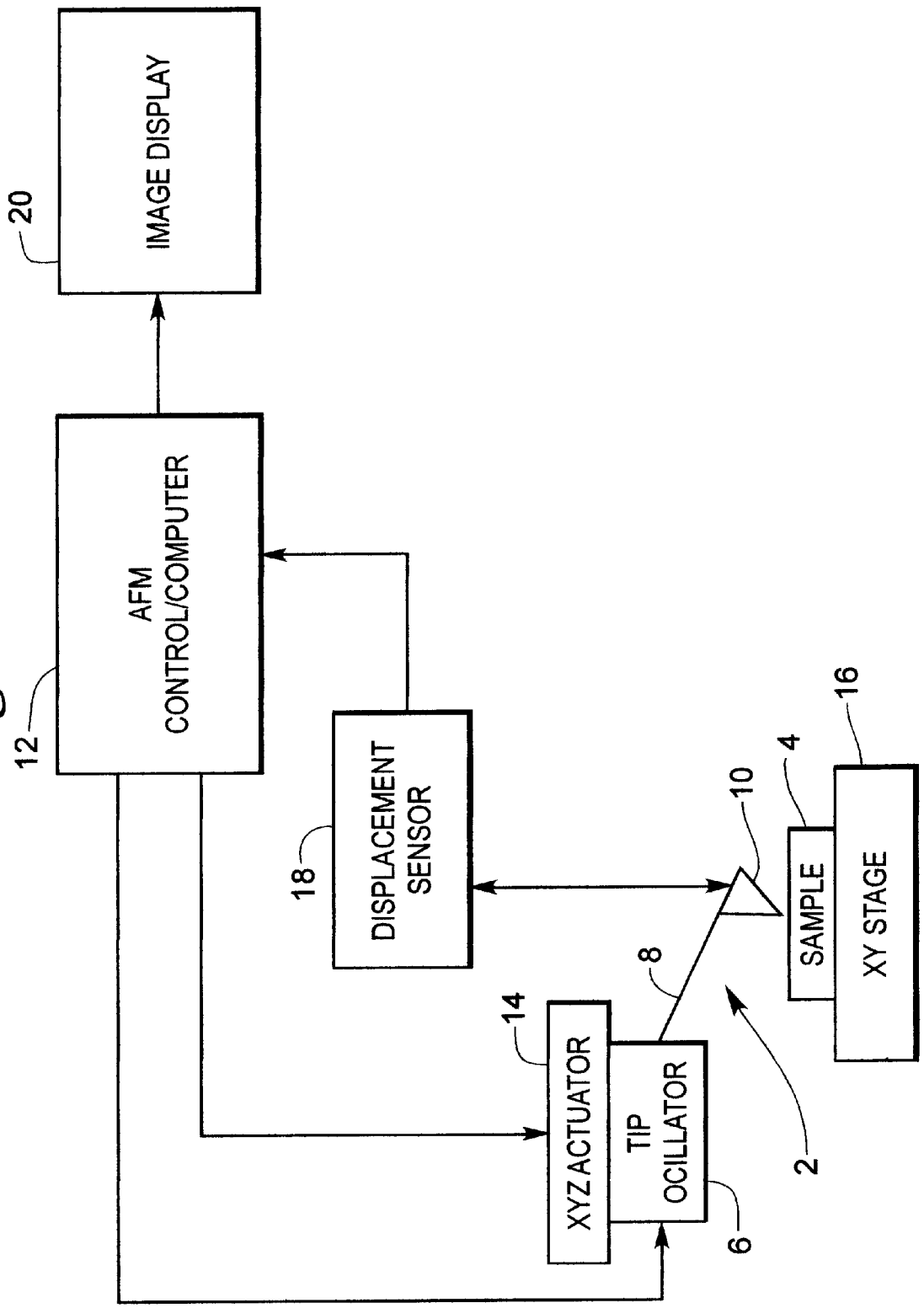
FIG. 6 schematically illustrates an atomic force microscope (AFM) capable of performing a line-based surface characterization procedure in accordance with the present invention.

As discussed above, the line-based data required to perform the calculations of Equations 1–6 can be obtained using 1) an optical instrument such as an interferometer; 2) an electron microscope; 3) a probe-based instrument such as an SPM or a profilometer; or 4) any other instrument capable of obtaining, recording, and manipulating digital line-based information concerning topography of a sample surface. While all of these applications are within the scope of the present invention, it is currently preferred that the data be obtained, recorded, and manipulated by a probe-based instrument such as a profilometer or a scanning probe microscope. An AFM is especially preferred. An AFM capable of acquiring the required data, recording that data, and manipulating the data to perform the required line-based calculations is schematically illustrated in FIG. 6.

The AFM includes a probe 2 which is scanned over a sample 4 such as the surface S2 of plate P2 in FIG. 1 in non-contact, constant contact, or in intermittent contact with the surface being measured. The probe 2 can be oscillated by a tip oscillator 6 to drive the probe 2 appropriately, usually at or near the probe's resonant frequency. The probe 2 includes 1) a cantilever 8 having a fixed base and a free end, and 2) a tip 10 disposed on the free end of the cantilever 8. An electronic signal is applied, under control of an AFM control/computer 12, from an AC signal source (not shown) to the oscillator 6 to drive the probe 2 to oscillate at a free oscillation amplitude $A_o$ as described, for instance, in U.S. Pat. No. 5,412,980 by Elings et al. The probe 2 can also be scanned over and driven towards and away from the sample 4 using a suitable XYZ actuator assembly 14 which is also controlled by the computer 12. It should be noted that the AFM could also be configured for mounting the sample 4 on an X-Y stage 16 that is movable so that the X-Y stage can be used to translate and/or scan the sample 4 relative to the probe.

Scanning typically occurs in a raster scan pattern in which 1) the lines L1 to Ln are traced by controlling the actuator assembly 14 to drive the probe 2 in the X direction and 2) the probe 2 is repositioned at the end of each trace in preparation for the next trace by controlling the actuator assembly 14 to drive the probe 2 in the Y direction. However, the invention permits two important departures from a traditional raster scan that vastly improve the data acquisition rate.

First, because a statistically-significant number n of traced lines needs to be traced, the distance $\Delta Y$ that the probe moves between tracings should be much greater than exhibited by a typical raster scan patterns. Hence, as discussed above, the number of traced lines traced can be reduced from a standard 512 to as few as even a single traced line of data with a corresponding decrease in total data acquisition time. The potential for a statistically-justified reduction in the number of line traces required to make a reasonable estimate of the surface area also results in a proportionate increase in the lifetime of the AFM or other instrument.

Second, traditional AFM data acquisition schemes acquire data only unidirectionally in order to reduce the contribution of scanner hysteresis to low frequency or interline noise during data acquisition. Hence, only one of the forward (trace) or the return (re-trace) strokes of probe movement in the X direction are used for data acquisition. However, the present invention is immune to scanner hysteresis contributions to inter-line noise because it does not require any registration of inter-line data from multiple lines required to produce images. The AFM therefore can acquire data bidirectionally, i.e., during both the trace and retrace strokes of the probe 2 in the X direction, without reducing measurement precision. As a result, the data acquisition rate is doubled again beyond the manifold increase resulting from the ability to eliminate the vast majority of scan lines. As a practical matter, measurements that typically previously took 512 seconds under one set of scanning parameters (e.g., 512 lines a 1 Hz scan rate, unidirectional scanning) could now be obtained in a small fraction of that time, for example, eight seconds under ostensibly the same set of scanning parameters (e.g., 1 Hz scan rate, but now with only 16 lines of data, and bidirectional scanning enabled).

Probe displacement is typically monitored by a suitable displacement sensor 18 that may, for example, employ a laser and photodetector as well as other components. As is known in the art, the signals from the sensor 18 can be used to determine probe oscillation amplitude, frequency, and phase, as well as other parameters, and so measure the probe-sample interaction. The computer 12 can use this measurement as a feedback signal to control the vertical probe-sample position via the actuator assembly 14 so as to keep the probe-sample interaction constant as the actuator scans the probe laterally over the sample surface in an X-Y plane. In this feedback mode, the voltage or signal applied to the Z (vertical) portion of the actuator assembly 14 is used to obtain the above-described X, Z coordinate data. That data is then recorded in a memory of the computer 12 and manipulated to solve one or more of Equations 1–6 above and possibly to obtain additional information such as the enhanced capacitance of the capacitor C of FIG. 1. Finally, a suitable image display device 20 is connected to the computer 12 and displays a humanly-discernible image (such as a video image) of an output signal which may, for instance, relate to the surface area, surface area enhancement, roughness, and capacitance.

Many changes and modifications may be made to the invention without departing from the spirit thereof. The scope of some of these changes are discussed above. The scope of other changes will become apparent from the appended claims.

I claim:

1. A method for determining a surface area enhancement characteristic of a three-dimensional surface relative to a projected surface area corresponding to a projection of said three-dimensional surface onto an X-Y plane wherein X corresponds to the width direction, Y corresponds to the depth direction and Z corresponds to the height direction extending perpendicular to the X-Y plane, and wherein the method comprises the steps of:

(A) tracing a plurality of lines over said three-dimensional surface using a metrology instrument, wherein each of said plurality of traced lines has components extending in at least an X direction and in a Z direction, each one of said plurality of traced lines being spaced apart from one another;

(B) determining an actual length of each of said plurality of traced lines through the application of the Pythagorean theorem;

(C) determining a projected length for each one of said plurality of lines respectively by excluding Z components thereof; and (D) determining said surface area enhancement characteristic by calculating the squared ratio of the sum of the plurality of actual lengths determined in step (B) to a sum of said projected lengths determined in step (C).

2. The method of as defined in claim 1, wherein said metrology instruments is a probe-based instrument having a probe and wherein, for each one of said plurality of traced lines, the projected length of said traced line is equal to a scan length defined as a distance traversed during relative movement between said probe and said three-dimensional surface, excluding Z components of the traced line.

3. A method as defined in claim 2, wherein each of said traced lines lacks any Y components and wherein, for each of said traced lines, the projected length of said traced line is equal to a distance $L_{proj}$ traversed during relative movement between said probe and said surface in said X direction that records m data points spaced along said traced line, said distance $L_{proj}$ being determined according to the equation:

$$L_{proj} = x_m - x_1$$

where: $x_m$ is the corresponding distance value of the $m^{th}$ data point in the traced line; and $x_1$ is the distance value of the $1^{st}$ data point of the traced line in the X direction.

4. A method as defined in claim 2, wherein each of said traced lines is circular, and wherein, for each of said traced lines, the projected length of said traced line is equal to a distance $L_{proj}$ traversed during relative movement between said probe when said line is traced, said projected length being determined according to the equation:

$$L_{proj} = 2\pi r$$

where r is a radius of said traced line.

5. A method as defined in claim 2, further comprising determining said projected surface area by squaring a sum of said projected lengths according to the equation:

$$A_{proj} = \left( \sum_{j=1}^{n} L_{proj(j)} \right)^2$$

where n equals the number of traced lines.

6. The method as defined in claim 2, wherein the tracing step is performed during relative bi-directional movement between said probe and said three-dimensional surface.

7. The method as defined in claim 2, wherein said probe-based instrument is selected from the group consisting of a profilometer and a scanning probe microscope.

8. A method as defined in claim 7, wherein said probe-based instrument is an atomic force microscope.

9. The method as defined in claim 2, wherein said projected surface area is equal to a scan area defined as an area traversed during the tracing step.

10. A method as defined in claim 1, wherein the step of determining the actual length of said traced lines comprises, for each said traced line, solving the following equation:

$$L_{ACT} = \sum_{i=1}^{m-1} d_i$$

where:

$L_{ACT}$ is the actual length of said traced line;

m is a total number of data points acquired along said traced line by said instrument;

and $d_i$ is a determined length of a line segment connecting two adjacent data points on said traced line;

and wherein, for each of said traced lines, $d_i$ is determined according to the equation:

$$d_i = \sqrt{(x_{i+1} - x_i)^2 + (z_{i+1} - z_i)^2}$$

where:

$x_i$ is the $i^{th}$ data point disposed along said traced line;

$x_{i+1}$ is the adjacent data point in the positive x-direction;

$z_i$ is a height value in the Z direction corresponding to the $x_i^{th}$ data point; and $z_{i+1}$ is a height value in the Z direction corresponding to the $x_{i+1}^{th}$ data point.

11. A method as defined in claim 10, wherein each of said traced lines lacks Y components and has a scan length in said X direction, and further comprising determining said projected surface area by squaring a sum of said scan lengths.

12. A method as defined in claim 1, wherein said three-dimensional surface is an electrically conductive surface of an electronic device.

13. A method as defined in claim 1, wherein said three-dimensional surface is an electrically conductive surface of a capacitor.

14. The method as defined in claim 1, further including the steps of generating and displaying a humanly-discemable image indicative of said surface area enhancement characteristic.

15. The method as defined in claim 1, further including, following the tracing step, the step of determining surface roughness parameters including at least one of roughness, skewness, and kurtosis.

16. A method for determining a surface area enhancement of a three-dimensional isotropic conductive surface relative to a projected surface area corresponding to a projection of said surface onto an X-Y plane, the method comprising the steps of:
  (A) tracing a plurality (n) of lines over said surface using a probe-based instrument, wherein, for each of said traced lines, relative probe-surface movement occurs through a scan length in an X direction, and wherein at least one of said traced lines has components extending in said X direction and in a Z direction which is perpendicular to said X direction so that the actual length of said traced line is longer than the scan length of said traced line, said traced lines being spaced apart in a Y direction that is perpendicular to said X direction and said Z direction and lacking components in said y direction;
  (B) determining the actual length ($L_{ACT}$) of each of said n traced lines by solving the following equation:

$$L_{ACT} = \sum_{i=1}^{m-1} d_i$$

where:
$L_{ACT}$ is the actual length of said traced line;
m is a total number of data points acquired along said traced line by said instrument;
and $d_i$ is a determined length of a line segment connecting two adjacent data points on said traced line;
and wherein, for each of said traced lines, $d_i$ is determined according to the equation:

$$d_i = \sqrt{(x_{i+1}-x_i)^2 + (z_{i+1}-z_i)^2} \quad (1)$$

where:
$x_i$ is the $i^{th}$ data point disposed along said traced line;
$x_{i+1}$ is the adjacent data point in the positive x-direction;
$z_i$ is a height value in the Z direction corresponding to the $x_i^{th}$ data point; and
$z_{i+1}$ is a height value in the Z direction corresponding to the $x_{i+1}^{th}$ data point
  (C) determining said projected surface area by squaring a sum of said scan lengths; and
  (D) determining said surface area enhancement by calculating the ratio of a squared sum of the actual lengths to said projected surface area.

17. An improved method of analyzing the results of tracing a plurality of lines over a three-dimensional surface using a metrology instrument for the purpose of determining a surface area enhancement characteristic of the three-dimensional surface relative to a projected surface area corresponding to a projection of said three-dimensional surface onto an X-Y plane wherein X corresponds to the width direction, Y corresponds to the depth direction and Z corresponds to the height direction extending perpendicular to the X-Y plane, and wherein each of said plurality of traced lines has components extending in at least an X direction and in a Z direction and each one of said plurality of traced lines are spaced apart from one another, the improved method comprising:
  (A) determining an actual length of each of said plurality of traced lines through the application of the Pythagorean theorem;
  (B) determining a projected length for each one of said plurality of lines respectively by excluding Z components thereof; and
  (C) determining said surface area enhancement characteristic by calculating the squared ratio of a sum of the plurality of actual lengths determined in step (A) to a sum of said projected lengths determined in step (B).

18. The method of as defined in claim 17, wherein said metrology instruments is a probe-based instrument having a probe and wherein, for each one of said plurality of traced lines, the projected length of said traced line is equal to a scan length defined as a distance traversed during relative movement between said probe and said three-dimensional surface, excluding Z components of the traced line.

19. A method as defined in claim 18, wherein each of said traced lines lacks any Y components and wherein, for each of said traced lines, the projected length of said traced line is equal to a distance $L_{proj}$ traversed during relative movement between said probe and said surface in said X direction that records m data points spaced along said traced line, said distance $L_{proj}$ being determined according to the equation:

$$L_{proj} = x_m - x_1$$

where: $x_m$ is the corresponding distance value of the $m^{th}$ data point in the traced line and;
$x_1$ is the distance value of the $1^{st}$ data point of the traced line in the X direction.

20. The method as defined in claim 18, wherein said probe-based instrument is selected from the group consisting of a profilometer and a scanning probe microscope.

21. A method as defined in claim 20, wherein said probe-based instrument is an atomic force microscope.

22. A method as defined in claim 18, wherein each of said traced lines is circular, and wherein, for each of said traced lines, the projected length of said traced line is equal to a distance $L_{proj}$ traversed during relative movement between said probe when said line is traced, said projected length being determined according to the equation:

$$L_{proj} = 2\pi r$$

where r is a radius of said traced line.

23. A method as defined in claim 18, further comprising determining said projected surface area by squaring a sum of said projected lengths according to the equation:

$$A_{proj} = \left(\sum_{j=1}^{n} L_{proj(j)}\right)^2$$

where n equals the number of traced lines.

24. The method as defined in claim 18, wherein the tracing step is performed during relative bi-directional movement between said probe and said three-dimensional surface.

25. The method as defined in claim 18, wherein said projected surface area is equal to a scan area defined as an area traversed during the tracing step.

26. A method as defined in claim 17, wherein the step of determining the actual length of said traced lines comprises, for each said traced line, solving the following equation:

$$L_{ACT} = \sum_{j=1}^{m-1} di$$

where:
- $L_{ACT}$ is the actual length of said traced line;
- m is a total number of data points acquired along said traced line by said instrument;
- and $d_i$ is a determined length of a line segment connecting two adjacent data points on said traced line;
- and wherein, for each of said traced lines, $d_i$ is determined according to the equation:

$$d_i = \sqrt{(x_{i+1}-x_i)^2 + (z_{i+1}-z_i)^2}$$

where:
- $x_i$ is the $i^{th}$ data point disposed along said traced line;
- $x_{i+1}$ is the adjacent data point in the positive x-direction;
- $z_i$ is a height value in the Z direction corresponding to the $x_i^{th}$ data point; and
- $Z_{i+1}$ is a height value in the Z direction corresponding to the $x_{i+1}^{th}$ data point.

27. A method as defined in claim 26, wherein each of said traced lines lacks Y components and has a scan length in said X direction, and further comprising determining said projected surface area by squaring a sum of said scan lengths.

28. A method as defined in claim 17, wherein said three-dimensional surface is an electrically conductive surface of an electronic device.

29. A method as defined in claim 17, wherein said three-dimensional surface is an electrically conductive surface of a capacitor.

30. The method as defined in claim 17, further including the steps of generating and displaying a humanly-discemable image indicative of said surface area enhancement characteristic.

31. The method as defined in claim 17, further including, following the tracing step, the step of determining surface roughness parameters including at least one of roughness, skewness, and kurtosis.

32. An improved method of analyzing the results of tracing a plurality (n) of lines over said surface using a probe-based instrument for determining a surface area enhancement of a three-dimensional isotropic conductive surface relative to a projected surface area corresponding to a projection of said surface onto an X-Y plane, wherein relative probe-surface movement occurs through a scan length in an X direction, and wherein at least one of said traced lines has components extending in said X direction and in a Z direction which is perpendicular to said X-Y plane so that the actual length of said traced line is longer than the scan length of said traced line, said traced lines being spaced apart in a Y direction that is perpendicular to said X direction and said Z direction and lacking components in said y direction, the improvement comprising:

(A) determining the actual length ($L_{ACT}$) of each of said n traced lines by solving the following equation:

$$L_{ACT} = \sum_{j=1}^{m-1} di$$

where:
- $L_{ACT}$ is the actual length of said traced line;
- m is a total number of data points acquired along said traced line by said instrument;
- and $d_i$ is a determined length of a line segment connecting two adjacent data points on said traced line;
- and wherein, for each of said traced lines, di is determined according to the equation:

$$d_i = \sqrt{(x_{i+1}-x_i)^2 + (z_{i+1}-z_i)^2}$$

where:
- $x_i$ is the $i^{th}$ data point disposed along said traced line;
- $x_{i-1}$ is the adjacent data point in the positive x-direction;
- $z_i$ is a height value in the Z direction corresponding to the $x_{i+1}^{th}$ data point (B) determining said projected surface area by squaring a sum of said scan lengths; and (C) determining said surface area enhancement by calculating the ratio of a squared sum of the actual lengths to said projected surface area.

* * * * *